United States Patent [19]
Jarrard

[11] Patent Number: 6,123,892
[45] Date of Patent: *Sep. 26, 2000

[54] VARIABLE ORIENTATION MAGNET MOLDING TOOL

[75] Inventor: Craig A. Jarrard, Middlebury, Ind.

[73] Assignee: CTS Corporation

[*] Notice: This patent is subject to a terminal disclaimer.

[21] Appl. No.: 09/312,693

[22] Filed: May 14, 1999

[51] Int. Cl.$^7$ ..................................... H05B 6/00
[52] U.S. Cl. .................. 264/429; 425/3; 425/DIG. 33
[58] Field of Search ................. 425/3, DIG. 33; 264/427, 478, 429

[56] References Cited

U.S. PATENT DOCUMENTS

| | | | |
|---|---|---|---|
| 4,444,550 | 4/1984 | Loubier | 425/3 |
| 4,604,042 | 8/1986 | Tanigawa et al. | 425/3 |
| 5,453,224 | 9/1995 | Kuroda | 264/427 |

FOREIGN PATENT DOCUMENTS

| | | |
|---|---|---|
| 4250013 | 9/1992 | Japan . |
| 11144947 | 5/1999 | Japan . |

*Primary Examiner*—Harold Pyon
*Assistant Examiner*—Thukhanh T. Nguyen
*Attorney, Agent, or Firm*—Mark P. Bourgeois; Mark W. Borgman

[57] ABSTRACT

A magnet molding tool for controlling the orientation of magnetic particles in a polymer bonded magnet during injection molding. A magnet mold has a mold cavity. A flux generator is connected to the magnet mold for applying a magnetic field in the cavity. An upper plate is attached to the magnet mold to modify the magnetic field in the cavity such that the orientation of the magnetic particles varies proportionally to the dimensions of the plate.

4 Claims, 1 Drawing Sheet

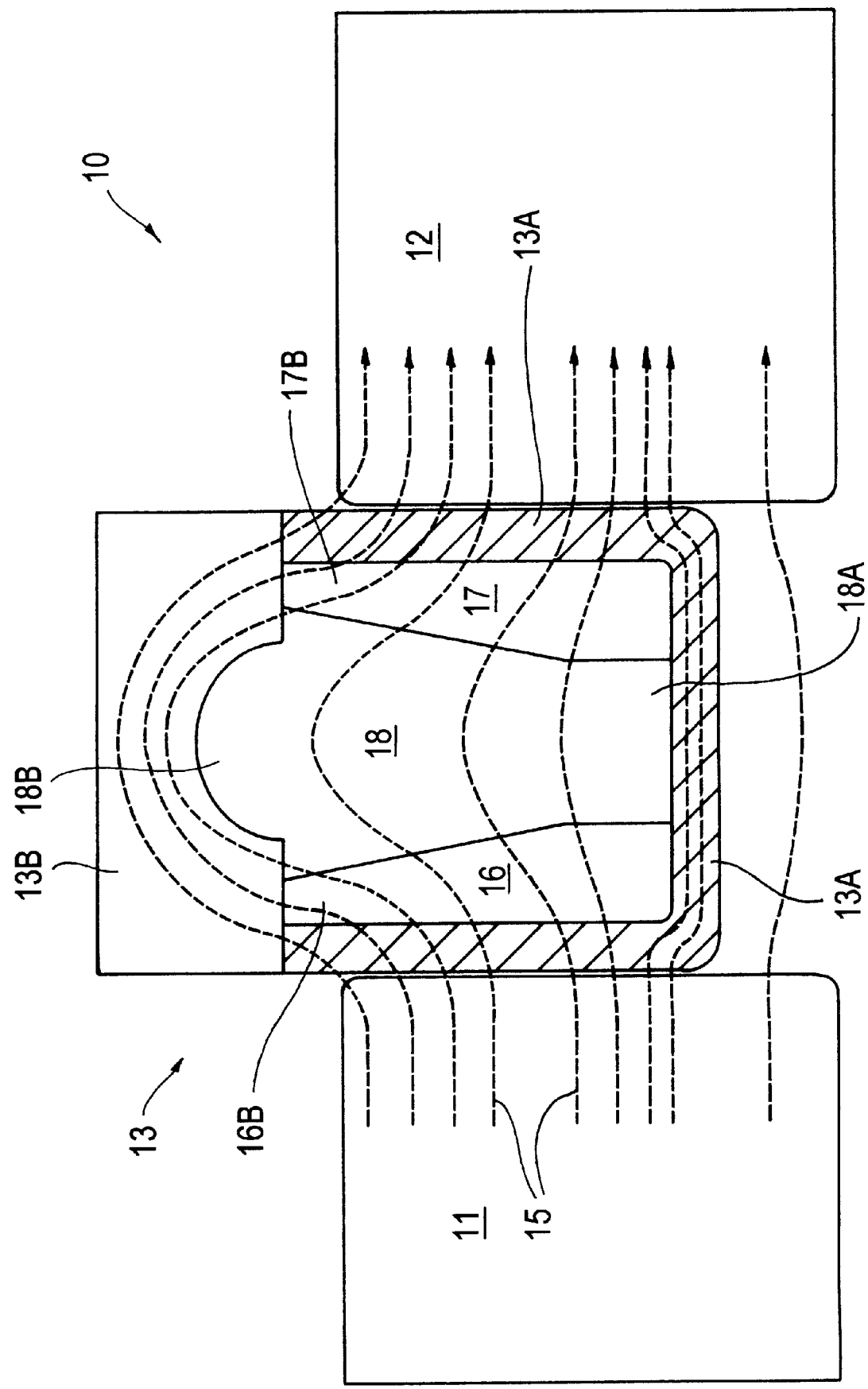

VARIABLE ORIENTATION MAGNET MOLDING TOOL

CROSS REFERENCE TO RELATED AND CO-PENDING APPLICATIONS

This application is related to U.S. patent application filed Mar. 26. 1999 titled variable orientation magnet molding tool and has the same inventorship and assignee as the present invention and is herein incorporated by reference.

FIELD OF THE PREFERRED EMBODIMENT(S)

This invention generally relates to a device to mold polymer bonded magnets. More specifically, the invention relates to a tool for variably controlling the orientation of the magnetic particles during molding of polymer bonded magnets.

1. Background of the Invention

Polymer bonded magnets are used in a variety of applications from refrigerator magnets to magnets for use in non-contacting position sensors. In non-contacting position sensors, the magnets need to have a magnetic field strength that varies along at least one dimension of the magnet. This can be done by varying one or more dimensions of the magnet. In other words, the magnet has a slope with a thick end and a thin end. Polymer magnets are molded by injecting a heated polymer containing magnetic particles into a mold. An electromagnet is placed adjacent the mold during molding to orient the magnetic particles in the desired direction for maximum field strength. Molding variable thickness magnets presents its own unique set of problems. For example, it is difficult to mold magnets that have a uniform slope. Also, it is difficult to mold magnets that have very thin sections as the thin sections are very brittle and break off. It is desirable to use a more constant thickness magnet and impart a variable orienting magnetic field strength to the magnet or to vary the magnetic field strength in sloping magnets without very thin sections.

This and other problems will be solved by the preferred embodiments of the invention.

2. Description of Related Art

Examples of a patent related to the present invention are as follows, wherein each patent is herein incorporated by reference for related and supporting teachings:

U.S. Pat. No. 4,444,550 is a Permanent Magnet Mold Apparatus.

The foregoing patent reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

SUMMARY OF THE PREFERRED EMBODIMENT(S)

It is a feature of the invention to provide a magnet molding tool for controlling the orientation of magnetic particles in a polymer bonded magnet during injection molding. The tool includes a magnet mold having a mold cavity and a flux generating mechanism for applying a magnetic field in the cavity, connected to the magnet mold. A flux modifying mechanism is connected to the mold to modify the magnetic field in the cavity.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawing as follows:

FIG. 1 is a cross-sectional view of the preferred embodiment of a magnet molding tool.

It is noted that the drawing of the invention is not to scale. The drawing is merely a schematic representation, not intended to portray specific parameters of the invention. The drawing is intended to depict only typical embodiments of the invention, and therefore should not be considered as limiting the scope of the invention. The invention will be described with additional specificity and detail through the accompanying drawing.

DETAILED DESCRIPTION OF THE PREFERRED EMBODIMENTS

Referring to FIG. 1, there is a cross-sectional view of the preferred embodiment of a variable orientation magnet molding tool 10. A pair of conventional wire wound electromagnets 11 and 12 are positioned on each side of a magnet mold 13. The electromagnets are held by additional brackets (not shown). Mold 13 has a U-shaped mold plate 13A. Plate 13A represents the mold cavity periphery and may or may not be magnetically permeable. An C-shaped upper magnetic steel plate 13B is placed over the top of plate 13A. Attached to plate 13B is a non-magnetic blade 18. Blade 18 can be formed from a suitable non-magnetic metal. Blade 18 has a flat end 18A that abuts next to plate 13A and a rounded end 18B that abuts next to plate 13B. Blade 18 is attached to plate 13B using conventional fasteners or is welded. Blade 18, and plates 13A and 13B define mold cavities 16 and 17. Cavity 16 has a thick end 16A and a thin end 16B. Cavity 17 has a thick end 17A and a thin end 17B. An injection port (not shown) would be provided in plate 13A to allow the injection of liquid plastic during molding into cavities 16 and 17.

Operation of the Preferred Embodiment

The operational use of the magnet molding tool 10 of FIG. 1 is described next. Magnet molding tool 10 is placed in a conventional plastic injection mold. A liquid heated mixture of magnetic particles and a polymer or plastic is injected into mold cavities 16 and 17 by a port (not shown). The magnetic particles and polymers are commercially available from Arnold Engineering of Marengo, Ill. or from Kane Corporation of Kane, Pa. A current is applied to electromagnets 11 and 12 causing a flux 15 to flow, through one side of plate 13A, cavity 16, blade 18, cavity 17 and through another side of plate 13A. The current applied to electromagnets 11 and 12 is in the same direction so that flux 15 generated by the magnet flows in the same direction.

Magnetic steel plate 13B and non-magnetic blade 18 causes the flux 15 or magnetic field strength to vary across cavities 16 and 17. At thick ends 16A and 17A, the flux lines 15 flow in a straighter line across cavities 16 and 17. At thin ends 16B and 17B, flux lines 15 flow toward and through plate 13B rather than blade portion 18A and have more of a curved shape across cavities 16 and 17. The field 15 applied to the magnetic particles suspended in the liquid plastic causes the particles to rotate or orient so as to align themselves with the flux field. The variable magnetic field flowing across mold cavities 16 and 17 causes the orientation or rotation of the magnetic particles in the cavities to vary proportional to the dimensions of magnetic steel plate 13 and non-magnetic blade 18. After the mold 13 is cooled and the plastic solidifies, the magnetic particles are locked in place. The molded magnet is then removed. The magnetic particles in the magnet now have a varying orientation along the length of the magnet.

To take full advantage of the variable orientation field and direction, the same field distribution would have to be used in magnetizing the magnet, or both orientation and full magnetization might be achieved in a single step if the flux density in the mold were of sufficient magnitude. It is to be understood that orientation of the magnetic particles is a mechanical alignment of magnetic particles with a magnetic field. Whereas, magnetization of the magnetic particles is an electronic alignment of domains on an atomic level with a magnetic field.

U-shaped plate 13A is raised above the upper surfaces or offset from electromagnets 11 and 12. This places upper plate 13B out of direct alignment with the electromagnets and allows flux 15 to bend more as it passes through cavities 16 and 17.

Variations of the Preferred Embodiment(s)

One of ordinary skill in the art of making magnet molds will realize that there are many different ways of accomplishing the preferred embodiment. For example, it was shown that plate 13 has a U-shape, it is contemplated to make plate 13 shaped to have a series of steps, increasing in thickness or to be rectangular shaped.

The invention was shown using a pair of electromagnets 11 and 12. It is contemplated that a permanent magnet circuit could also be used in place of electromagnets 11 and 12.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A magnet molding tool for controlling orientation of magnetic particles in a polymer bonded magnet during injection molding, comprising:

a. a magnet mold having a mold cavity therein;

b. flux generating means, adjacent to the magnet mold for applying a magnetic field in the cavity;

c. a upper magnet plate attached to the magnet mold, and a non-magnet blade is connected to the upper magnet plate and extends into the mold cavity; and d. the upper magnet plate and the non-magnet blade dimensioned to modify the magnetic field in the mold cavity wherein the orientation direction of the magnetic particles varies proportionally to the dimensions of the upper magnet plate and the non-magnet blade.

2. The magnet molding tool according to claim 1, wherein the magnet mold has a U-shaped mold plate.

3. The magnet molding tool according to claim 2, wherein the flux generating means are at least one electromagnet.

4. A method of injection molding a polymer bonded magnet having a variable orientation of magnetic particles in the magnet, comprising the steps of:

a) providing a magnet mold having a mold cavity, an upper magnet plate attached to the magnet mold, and a non-magnet blade connected to the upper magnet plate and extended into the mold cavity, the upper plate dimensioned to modify an applied magnetic field in the cavity;

b) injecting a heated mixture of magnetic particles and polymer particles into the magnet mold cavity; and c) applying the magnetic field from an electromagnetic to the magnet mold cavity wherein the orientation of the magnetic particles in the magnet are varied proportional to the dimensions of the plate.

* * * * *